United States Patent
Kraft

(10) Patent No.: US 10,160,021 B2
(45) Date of Patent: Dec. 25, 2018

(54) DEEP-DRAWING OF A WORK PIECE

(71) Applicant: GM GLOBAL TECHNOLOGY OPERATIONS LLC, Detroit, MI (US)

(72) Inventor: Matthias Kraft, Rüsselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 14/974,226

(22) Filed: Dec. 18, 2015

(65) Prior Publication Data

US 2016/0175911 A1 Jun. 23, 2016

(30) Foreign Application Priority Data

Dec. 20, 2014 (DE) .......... 10 2014 019 328

(51) Int. Cl.
*B21D 22/20* (2006.01)
*G01B 11/02* (2006.01)

(52) U.S. Cl.
CPC ............ *B21D 22/20* (2013.01); *G01B 11/022* (2013.01)

(58) Field of Classification Search
None
See application file for complete search history.

(56) References Cited

U.S. PATENT DOCUMENTS

2014/0242346 A1* 8/2014 Nielsen .............. B21D 22/203
428/174
2015/0202675 A1 7/2015 Roscher et al.

FOREIGN PATENT DOCUMENTS

| DE | 4038867 A1 | 7/1991 |
|---|---|---|
| DE | 10152851 A1 | 5/2003 |
| DE | 10331939 A1 | 2/2005 |
| DE | 102012100096 A1 | 7/2013 |
| DE | 102012007995 A1 | 10/2013 |
| WO | 03073043 A1 | 9/2003 |

OTHER PUBLICATIONS

German Patent Office, German Search Report for German Application No. 102014019328.4, dated Oct. 21, 2015.

* cited by examiner

*Primary Examiner* — Qian Yang
(74) *Attorney, Agent, or Firm* — Lorenz & Kopf, LLP

(57) ABSTRACT

A method for deep-drawing a work piece includes recording an image arrangement with at least one image of a deep-drawn work piece arranged on a lower part of a deep-drawing tool while opening or after opening the deep-drawing tool. A characteristic arrangement with at least one characteristic in the image arrangement is detected and compared with a predefined reference arrangement.

12 Claims, 1 Drawing Sheet

DEEP-DRAWING OF A WORK PIECE

CROSS-REFERENCE TO RELATED APPLICATION

This application claims priority to German Patent Application No. 102014019328.4, filed Dec. 20, 2014, which is incorporated herein by reference in its entirety.

TECHNICAL FIELD

The present disclosure pertains to a method for deep-drawing a work piece, a device, as well as a deep-drawing system with such a device.

BACKGROUND

DE 10 2012 007 995 A1 discloses a method for controlling a deep-drawing tool during the forming of a metal sheet, wherein an optical semiconductor sensor arranged in a recess of a sheet metal holder or in a draw die of the deep-drawing tool records images of a detection area on a main surface of the metal sheet at two different points in time during the deep-drawing process. A graphical analysis, which is carried out similar to that in an optical computer mouse, makes it possible to detect a motion of points on the surface of the metal sheet and to determine a draw of the metal sheet thereof during the deep-drawing process.

SUMMARY

An embodiment of the present disclosure is intended to improve the deep-drawing of a work piece. According to one aspect of the present disclosure, a method for deep-drawing a work piece is disclosed. An image arrangement is recorded with at least one image of a deep-drawn work piece arranged on a lower part of a deep-drawing tool. The image may be captured while opening or after opening the deep-drawing tool by a camera arrangement with at least one camera. A characteristic arrangement having with at least one characteristic in the image arrangement is detected and the detected characteristic arrangement is compared with a predefined reference arrangement.

According to another aspect of the present disclosure, a device for evaluating the deep-drawing of a work piece includes a camera arrangement with one or more cameras that are spaced apart from one another and, in particular, lie opposite of one another in order to record an image arrangement with at least one image of a deep-drawn work piece arranged on a lower part of a deep-drawing tool while opening or after opening the deep-drawing tool. An image processor detects a characteristic arrangement with at least one characteristic in the image arrangement, and compares the detected characteristic arrangement with a predefined reference arrangement. In one embodiment, the device is implemented, in particular, in the form of hardware and/or software technology in order to carry out a method of the type described herein.

According to one aspect of the present disclosure, a deep-drawing system features a deep-drawing tool for deep-drawing work pieces and a device of the type described herein. The work piece may consist, in particular, of a piece of sheet metal. In one embodiment, it forms a component of the body of a motor vehicle, particularly a passenger car. In one embodiment, the work piece respectively consists of a sheet metal blank prior to the deep-drawing process or is formed of a sheet metal blank by a deep-drawing process.

In one embodiment, the deep-drawing tool features a lower part and a blank holder for clamping the work piece against the lower part, particularly in accordance with the above-referenced patent publication DE 10 2012 007 995 A1. In one embodiment, the blank holder and the lower part are configured to be moved relative to one another, in particular, in order to clamp a flange of the work piece in such a way that material of the flange can flow into a draw die during the deep-drawing process. Accordingly, opening of the deep-drawing tool may include, spacing apart the blank holder from the lower part and the deep-drawn work piece arranged thereon.

In one embodiment, the deep-drawing tool features an upper part that is configured to be moved relative to the lower part. In one embodiment, the blank holder may particularly be arranged movably on the lower part or rigidly or movably on the upper part and spaced apart from the deep-drawn work piece, in particular, by spacing apart the upper part from the lower part. Opening of the deep-drawing tool therefore may include, particularly consist of, spacing apart the upper part from the lower part and the deep-drawn work piece arranged thereon.

In one embodiment, the lower part features a draw die and the upper part features a drawing punch that, according to an enhancement, can be or is moved relative to the blank holder arranged on the upper part. In another embodiment, the lower part conversely features a drawing punch and the upper part features a draw die. In one embodiment, the drawing punch and the draw die can be or are moved relative to one another in order to deep-draw the work piece, in particular, due to a motion of the upper part relative to the lower part. In one embodiment, the lower part is arranged underneath the upper part referred to the direction of the gravitational force, wherein the lower part is in another embodiment arranged above the upper part referred to the direction of the gravitational force. According to one aspect, the designation as lower or upper part therefore merely serves, without loss of generality, for addressing two elements of the deep-drawing tool.

The deep-drawing of the work piece being carried out or the deep-drawing process respectively can be evaluated, particularly in quantitative terms, by comparing the detected characteristic arrangement with the predefined reference arrangement.

In one embodiment, the work piece can be assessed, in particular, on the basis of the comparison. It can especially be classified, in particular, as a reject or work piece of inferior quality if a deviation or differential parameter between the characteristic arrangement and the reference arrangement exceeds a predefined one-dimensional or multidimensional limiting value and/or as an acceptable work piece or a work piece of superior quality if the deviation or differential parameter does not exceed the predefined limiting value. In one embodiment, the device accordingly features means for assessing the work piece on the basis of the comparison, particularly in a manner described herein.

In one embodiment, one or more process parameters of a subsequent deep-drawing of another work piece by means of the deep-drawing tool or process parameters of a subsequent deep-drawing process respectively may be alternatively or additionally predefined on the basis of the comparison. It is particularly possible to globally OF locally predefine, especially change, a clamping force and/or a spacing between the blank holder and the lower part on the basis of the comparison. For example, a movement speed of the drawing punch may be alternatively or additionally predefined, particularly changed, on the basis of the comparison. In one embodiment, the device accordingly features means for predefining at least one process parameter of a subsequent deep-drawing of another work piece by means of the deep-drawing tool on the basis of the comparison, particularly in a manner described herein.

In one embodiment, one characteristic or multiple characteristics of the characteristic arrangement respectively are a contour of the work piece. These characteristics can be detected, particularly identified by contour detection of the image arrangement based on brightness and/or color differences and/or with the aid of edge detection within the image arrangement. In one embodiment, a contour or a characteristic respectively is an outer rim or an outer edge of the work piece or a section thereof. Alternatively or additionally, a contour or a characteristic may respectively also be a contour within the outer edge, particularly an edge of a groove, a depression or a shoulder of the deep-drawn work piece or the like. Alternatively or additionally, a characteristic or multiple characteristic of the characteristic arrangement may respectively also be color and/or brightness values or the like.

In one embodiment, a sheet metal draw, which has taken place during the deep-drawing process, advantageously can be detected, in particular, due to the detection of the outer edge or a section thereof and, according to an enhancement, used for assessing the work piece and/or predefining process parameters of a subsequent deep-drawing process.

In one embodiment, the detection of the characteristic arrangement allows a global detection of the deep-drawing process having taken place. The detection of the deep-drawing process can thereby be improved, in particular, in comparison with selective or local detections of individual areas. In areas that are not detected selectively, it is possible, in particular, to take into consideration local deviations and/or to average local deviations.

In one embodiment, the reference arrangement is predefined on the basis of prior deep-drawing of one or more other work pieces by a deep-drawing tool and/or a numerical simulation of the deep-drawing process. In one embodiment, the device accordingly features a predefined reference arrangement on the basis of at least one prior deep-drawing process of another work piece by the deep-drawing tool and a numerical simulation, particularly in a manner described herein.

The reference arrangement particularly may feature an outer edge of the other work piece or a section thereof or an average and/or maximum and/or minimum value of several other previously deep-drawn work pieces. The reference arrangement may likewise feature an outer edge that was determined in a numerical simulation of the deep-drawing process.

In one embodiment, a one-dimensional or multi-dimensional differential parameter between the detected characteristic arrangement and the predefined reference arrangement is determined during the comparison and, according to an enhancement, the work piece is assessed and/or process parameters of a subsequent deep-drawing process are predefined based on this differential parameter. In one embodiment, the device accordingly features means for determining a differential parameter between the detected characteristic arrangement and the predefined reference arrangement during the comparison, particularly in a manner described herein. The differential parameter may include and particularly indicate a maximum and/or average distance of an outer edge of the deep-drawn work piece or a section thereof from a predefined outer reference edge or a corresponding section thereof.

In one embodiment, the camera arrangement is arranged outside the deep-drawing tool and/or an outer edge of the work piece. In one embodiment, this advantageously prevents the camera arrangement from interfering with the deep-drawing, tool, particularly the blank holder and the draw die. Alternatively or additionally, such a camera arrangement or deep-drawing system can in one embodiment be advantageously operated with different deep-drawing tools without having to change the camera arrangement. In one embodiment, at least two cameras that are spaced apart from one another advantageously make it possible to record a larger area, to compensate shadowing, in particular, by the deep-drawing tool and/or to reduce or compensate recording errors.

In one embodiment, the image arrangement features at least one image that is recorded while or after opening the deep-drawing tool, wherein the image arrangement may particularly consist of this image. The image arrangement or image sequence may likewise feature several images, wherein one or more of these images are recorded while the deep-drawing tool is opened and/or one or more of these images are recorded after the deep-drawing tool is opened. In one embodiment, a preliminary characteristic arrangement such as, for example, the respective outer edge of the deep-drawn work piece or a section thereof, is then detected in one or more of these images and the characteristic arrangement to be subsequently compared with the reference arrangement is then determined from one or more of these preliminary characteristic arrangements, particularly by determining average and/or maximum and/or minimum values. In another embodiment, one or more of these preliminary characteristic arrangements are respectively compared with the reference arrangement. The respective evaluation thereby can be advantageously improved in one embodiment.

In the context of the present disclosure, various means may be implemented in the form of hardware and/or software technology and feature, in particular, a digital processing unit, especially a microprocessor unit (CPU) that preferably is data-linked or signal-linked to a memory or other storage system and/or bus system, and further includes one or more computer program instruction sets or program modules. The CPU may be designed for processing commands implemented in the form of a program stored in a storage system, for acquiring input signals from a data bus and/or for sending output signals to a data bus. A storage system may feature, in particular, one or more different non-transitory, computer-readable storage mediums, especially optical storage mediums, magnetic storage mediums, solid-state storage mediums and/or other non-volatile mediums. The program may be realized in such a way that it embodies or is able to carry out the methods described herein such that the CPU can execute the steps of such methods and, in particular, thereby evaluate a deep-drawing process, assess the work piece and/or predefine process parameters.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
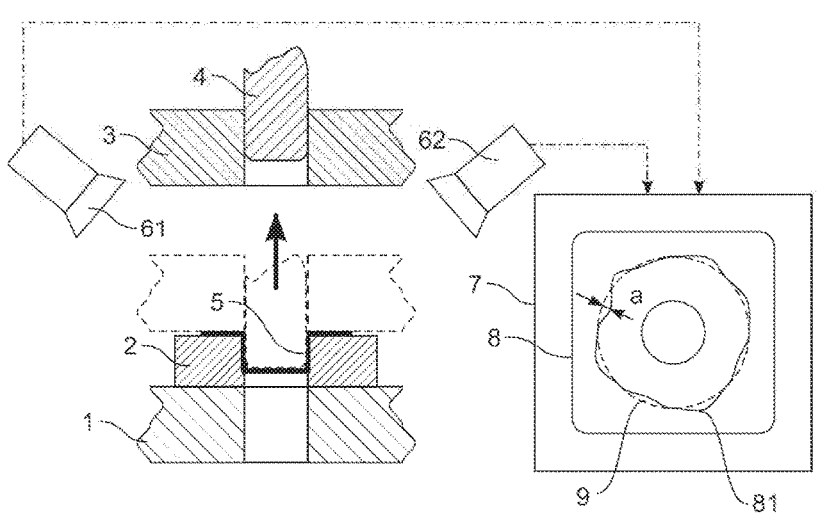
FIG. 1 shows a deep-drawing system according to an embodiment of the present disclosure.
Figure 2:
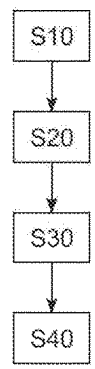
FIG. 2 shows a method according to an embodiment of the present disclosure.

FIG. 1 shows a deep-drawing system with a deep-drawing tool for deep-drawing work pieces and a device for carrying out the embodiment of the inventive method described below with reference to FIG. 2. The deep-drawing tool features a lower part 1 with a draw die 2 and an upper part with a blank holder 3 and a drawing punch 4 that can be displaced relative thereto.

The broken lines in FIG. 1 indicate that, when the deep-drawing tool is closed, the blank holder 3 clamps a flange of a sheet metal blank against the lower part 1 in such a way that material from the flange can flow into the draw die 2 when the drawing punch 4 moves into the draw die. The sheet metal blank is thereby formed into a deep-drawn work piece 5. The clamping force can be globally or locally predefined in this case.

When the deep-drawing tool is opened, the blank holder 3 is after the retraction of the drawing punch 4 moved away from the deep-drawn work piece 5, which is still arranged on the lower part 1 of the deep-drawing tool, as indicated with an arrow in FIG. 1. A camera arrangement with two cameras 61, 62 is arranged outside the deep-drawing tool and therefore outside an outer edge of the work piece 5.

A method according to an embodiment of the present disclosure is described below with reference to FIG. 2, wherein said method is carried out by a computer 7 that is equipped with the corresponding software technology for this purpose. In a step S10, the cameras 61, 62 respectively record one or more images while and/or after the deep-drawing tool is opened as indicated with the motion arrow in FIG. 1, wherein one such image 8 is indicated in FIG. 1.

In a step S20, a characteristic arrangement in the form of an outer edge 81 of the work piece 5 is respectively detected in the images 8. As indicated in FIG. 1, this characteristic arrangement is in a step 330 compared with a reference arrangement in the form of an outer reference edge 9 that is indicated with broken lines in FIG. 1 and was predefined on the basis of a prior deep-drawing process of another work piece by means of the deep-drawing tool or a numerical simulation. In step S30, the computer 7 particularly determines a maximum distance a between the outer edge 81 detected in step S20 and the outer reference edge 9. In a step S40, the work piece 5 is assessed on the basis of the comparison in step S30: if the distance exceeds a predefined limiting value, the work piece is classified as a reject and otherwise approved as acceptable work piece.

Alternatively or additionally, a process parameter such as, for example, the local or global clamping force and/or the local OF global distance between the blank holder 3 and the lower part 1 is in step S40 predefined on the basis of the distance a, particularly increased in a simple embodiment, if the distance a exceeds a predefined limiting value.

The computer 7 or its components and/or programs running thereon detect the characteristic arrangement 81, compare the detected characteristic arrangement 81 with a predefined reference arrangement 9, assess the work piece 5, predefine a process parameter of a subsequent deep-drawing process of another work piece by the deep-drawing tool on the basis of the comparison, and determine a differential parameter a between the detected characteristic arrangement 81 and a predefined reference arrangement 9 during the comparison. The computer 7 or its components and/or programs running thereon may predefine the reference arrangement 9 on the basis of a prior deep-drawing process of another work piece by the deep-drawing tool and/or on the basis of a numerical simulation.

Accordingly, the computer 7 and the camera arrangement 61, 62 form a device for evaluating a deep-drawing process of a work piece 5 in accordance with an embodiment of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for deep-drawing a work piece comprising:
   closing a blank holder relative to a draw die arranged on a lower part of a deep-drawing tool with a blank work piece arranged in between and moving a drawing punch through the blank holder and into the draw die such that the blank work piece is formed into a deep-drawn work piece;
   at least partially opening the deep-drawing tool by retracting the drawing punch and the blank holder;
   acquiring an image arrangement with at least one image of the deep-drawn work piece arranged on the lower part of the deep-drawing tool;
   detecting a characteristic arrangement having at least one characteristic in the image arrangement;
   comparing the detected characteristic arrangement with a predefined reference arrangement;
   assessing the deep-drawings process on the basis of the comparison; and
   predefining at least one process parameter of a subsequent deep-drawing process of another work piece by the deep-drawing tool on the basis of the comparison.

2. The method according to claim 1, wherein the method further comprises detecting a contour of the work piece for detecting a characteristic arrangement.

3. The method according to claim 2, wherein the method further comprises detecting at least one of an outer edge of the work piece or a section of the outer edge.

4. The method according to claim 1, wherein the method further comprises predefining the reference arrangement on the basis of a numerical simulation.

5. The method according to claim 1, wherein the method further comprises determining a differential parameter between the detected characteristic arrangement and the predefined reference arrangement during the comparison.

6. The method according to claim 1, wherein the method further comprises acquiring an image arrangement by recording the at least one image on a camera arrangement having at least one camera arranged outside an outer edge of the work piece.

7. A method for deep-drawing a work piece comprising:

closing a blank holder relative to a draw die arranged on a lower part of a deep-drawing tool with a blank work piece arranged in between and moving a drawing punch through the blank holder and into the draw die such that the blank work piece is formed into a deep-drawn work piece;

at least partially opening the deep-drawing tool by retracting the drawing punch and the blank holder;

acquiring an image arrangement with at least one image of the deep-drawn work piece arranged on the lower part of the deep-drawing tool;

detecting a characteristic arrangement having at least one characteristic in the image arrangement;

comparing the detected characteristic arrangement with a predefined reference arrangement, wherein the predefining of the reference arrangement is based on at least one prior deep-drawing process of another work piece by the deep-drawing tool; and assessing the deep-drawings process on the basis of the comparison.

8. A deep-drawing system comprising:

a deep-drawing tool for deep-drawing a work piece, the deep-drawing tool comprising:
   a lower part;
   a draw die arranged on the lower part;
   a blank holder configured to support a sheet metal blank and having a closed position in which the sheet metal blank is clamped by the blank holder against the draw die and an open position in which the blank holder is retracted relative to the draw die; and
   a drawing punch arranged to move through the blank holder and into the draw die in the closed position such that the blank work piece is formed into a deep-drawn work piece; and a device, comprising:
   a camera arrangement with at least one camera configured to record an image arrangement including at least one image of the deep-drawn work piece upon retraction of the blank holder into the open position; and
   an image processor configured to
      detect a characteristic arrangement with at least one characteristic in the image arrangement,
      compare the detected characteristic arrangement with a predefined reference arrangement,
      assess the work piece on the basis of the comparison, and
      predefine at least one process parameter of a subsequent deep-drawing process of another work piece by the deep-drawing tool on the basis of the comparison.

9. The deep-drawing system according to claim 8 wherein the image processor is further configured to predefine the reference arrangement on the basis of at least one prior deep-drawing process of another work piece by means of the deep-drawing tool.

10. The deep-drawing system according to claim 8 wherein the image processor is further configured to predefine the reference arrangement on the basis of a numerical simulation.

11. The deep-drawing system according to claim 8 wherein the image processor is further configured to determine a differential parameter between the detected characteristic arrangement and the predefined reference arrangement during the comparison.

12. The deep-drawing system according to claim 8, wherein the camera arrangement is arranged outside an outer edge of the work piece.

* * * * *